United States Patent [19]

Schmitz et al.

[11] Patent Number: 4,696,494
[45] Date of Patent: Sep. 29, 1987

[54] FLOWLINE ADJUSTABLE JOINT

[75] Inventors: Thomas R. Schmitz, Katy; William M. Taylor, Houston, both of Tex.

[73] Assignee: Cameron Iron Works, Inc., Houston, Tex.

[21] Appl. No.: 741,269

[22] Filed: Jun. 5, 1985

[51] Int. Cl.$^4$ ............................................. F16L 27/06
[52] U.S. Cl. ..................................... 285/18; 285/184; 285/263; 285/31
[58] Field of Search ............... 285/263, 261, 184, 185, 285/18, 31, 924

[56] References Cited

U.S. PATENT DOCUMENTS

| | | | |
|---|---|---|---|
| 2,564,670 | 8/1951 | Bratt | 285/18 |
| 3,023,995 | 3/1962 | Hopkins | 285/97 X |
| 3,096,999 | 7/1963 | Ahlstone et al. | 285/322 X |
| 3,658,366 | 4/1972 | Welch, Jr. et al. | 285/31 X |
| 3,717,920 | 2/1973 | Oliver et al. | 285/24 X |
| 3,727,954 | 4/1973 | Oliver | 285/263 X |
| 3,860,271 | 1/1975 | Rodgers | 285/97 |
| 3,997,197 | 12/1976 | Marsh et al. | 285/320 X |
| 4,012,059 | 3/1977 | Luke et al. | 285/18 |
| 4,045,054 | 8/1977 | Arnold | 285/261 X |
| 4,124,230 | 11/1978 | Ahlstone | 285/18 |
| 4,133,558 | 1/1979 | Ahlstone | 285/263 |
| 4,153,278 | 5/1979 | Ahlstone | 285/263 X |
| 4,153,281 | 5/1979 | Ahlstone | 285/263 X |
| 4,195,865 | 4/1980 | Martin | 285/263 X |
| 4,222,590 | 9/1980 | Regan | 285/97 X |
| 4,371,198 | 2/1983 | Martin | 285/263 X |
| 4,477,105 | 10/1984 | Wittman et al. | 285/18 |
| 4,486,037 | 12/1984 | Shotbolt | 285/263 X |
| 4,530,526 | 7/1985 | Dopyera et al. | 285/261 |
| 4,566,722 | 1/1986 | Huber et al. | 285/18 |

FOREIGN PATENT DOCUMENTS 1475680  4/1971  Fed. Rep. of Germany .

OTHER PUBLICATIONS

"Oil and Gas Journal", vol. 72, No. 51, Dec. 23, 1974, pp. 25-28, Misaligned Subsea Pipelines Joined".

*Primary Examiner*—Thomas F. Callaghan
*Attorney, Agent, or Firm*—Vinson & Elkins

[57] ABSTRACT

An adjustable flowline joint having an arcuate bell flange and a flanged assembly including a flange and a ring which are connected by studs and nuts, the assembly flange and ring have facing arcuate surfaces adapted to receive the arcuate bell flange therebetween, the nuts are tightened sufficiently to tension the studs to bring the arcuate surfaces into gripping clamping engagement with the arcuate bell flange and thereby make the joint rigid with metal-to-metal seals, an annular recess between the assembly flange and ring, and means for introducing fluid under pressure into the annular recess, whereby introduction of pressure into the recess increases the tension on the studs to cause sufficient elongation in them to relax the gripping clamping engagement of the surfaces on the arcuate bell flange and allow relative angular movement between the arcuate bell flange and the flange assembly to adjust angular relationship, release of pressure in the recess bringing the surfaces back into gripping engagement with the arcuate bell flange in a rigid metal-to-metal sealing relationship.

In replacing a section of subsea flowline, two flowline sections are connected together by the improved adjustable joint and each section has at its other end means for connecting to the subsea flowline which connecting means preferably includes another adjustable joint and a remotely operable connector such as a collet connector.

5 Claims, 4 Drawing Figures

FLOWLINE ADJUSTABLE JOINT

BACKGROUND

In some subsea applications, production from several subsea christmas trees flows through individual flowlines from each christmas tree to a central main gathering line on the ocean floor. As new wells are drilled and completed the flowlines from these wells are also connected into the main gathering line. Making a connection between the flowlines and the main gathering line is often accomplished by using an articulated piping system having flexible ball and socket joints as shown in U.S. Pat. Nos. 3,727,954 and 3,717,920 and remote collet type connectors as shown in U.S. Pat. No. 3,096,999. It is desirable that such an articulated piping system be capable of being made non-flexible or rigid after completion of the connection.

Other examples of connectors which have been suggested for making connections between misaligned subsea flowlines are shown in U.S. Pat. Nos. 4,153,278; 4,195,865; 4,045,054 and 3,997,197. Each of these patents discloses a ball and socket type of connection which can be used in connecting between two misaligned lines or which can accommodate relative movement of one of the lines angularly with respect to the other. U.S. Pat. No. 4,195,865 discloses a connection including a slip joint and a ball and socket joint to accommodate for differences in alignment of the two tubular members to be connected and the axial distance separating the two ends. The ball and socket joint includes the use of a bell flange on the end of one of the members which is positioned in a slot defined between two portions of the other member which members are moved together with a pressure actuated toggle joint which prevents the inadvertent separation of the joint.

U.S. Pat. No. 4,153,278 discloses another similar ball and socket joint with a flange extending outward in arcuate relationship to the tubular member having the ball portion of the joint on its end. The flange extends into an arcuate slot between two portions of the connection member and from which the actuating means for locking the joint members together is suspended. The purpose of the flange in the slot is to provide a stop for the relative angular motion between the members.

It would be advantageous in providing a connection for connecting individual flowings to a main gathering system to have a misalignment feature which allows connection between misaligned tubular members but which may be locked into its final connecting position so that it does not allow relative movement between the members once the connection has been made.

SUMMARY

The present invention relates to an improved flexible connection for subsea pipelines which allows misalignment but once connected is locked into its final connection position. This connection includes a flanged bell for connection by welding to one member and a two-piece assembly for connecting to the other member and providing an arcuate slot for receiving the bell flange. The two-piece assembly also includes a means for relaxing the normal clamping engagement of the assembly on the bell flange so that relative movement may take place to accommodate misalignment of the lines being connected and then once the misalignment has been accommodated the clamping engagement is re-established.

An object of the present invention is to provide an improved connector joint suitable for connection of misaligned subsea flowlines.

Another object is to provide an improved connector joint having a temporary flexibility for accommodating misalignment of the flowlines which it is to connect with the flexibility being cancelled once alignment is established.

A further object is to provide an improved subsea flowline connector joint which allows simple and quick connection to be made between misaligned subsea flowlines.

Still another object is to provide an improved subsea flowline joint which has only static metal-to-metal seals after having been installed.

BRIEF DESCRIPTION OF THE DRAWINGS

These and other objects and advantages of the present invention are hereinafter set forth and explained with reference to the drawings wherein.

BRIEF DESCRIPTION OF THE PREFERRED EMBODIMENT

Figure 2:
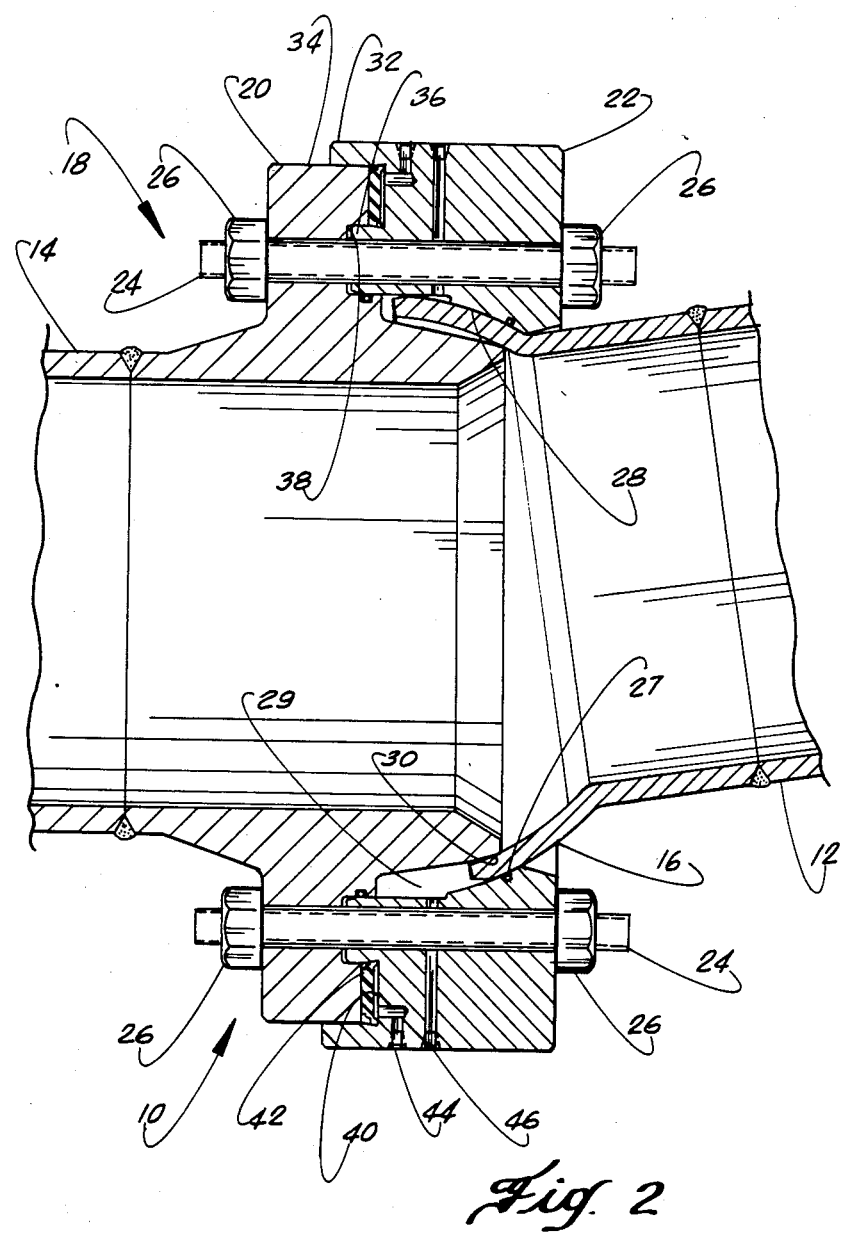
FIG. 2 is a sectional view of the improved subsea flowline connection joint showing the completed joint connection with misaligned flowlines.
Figure 3:
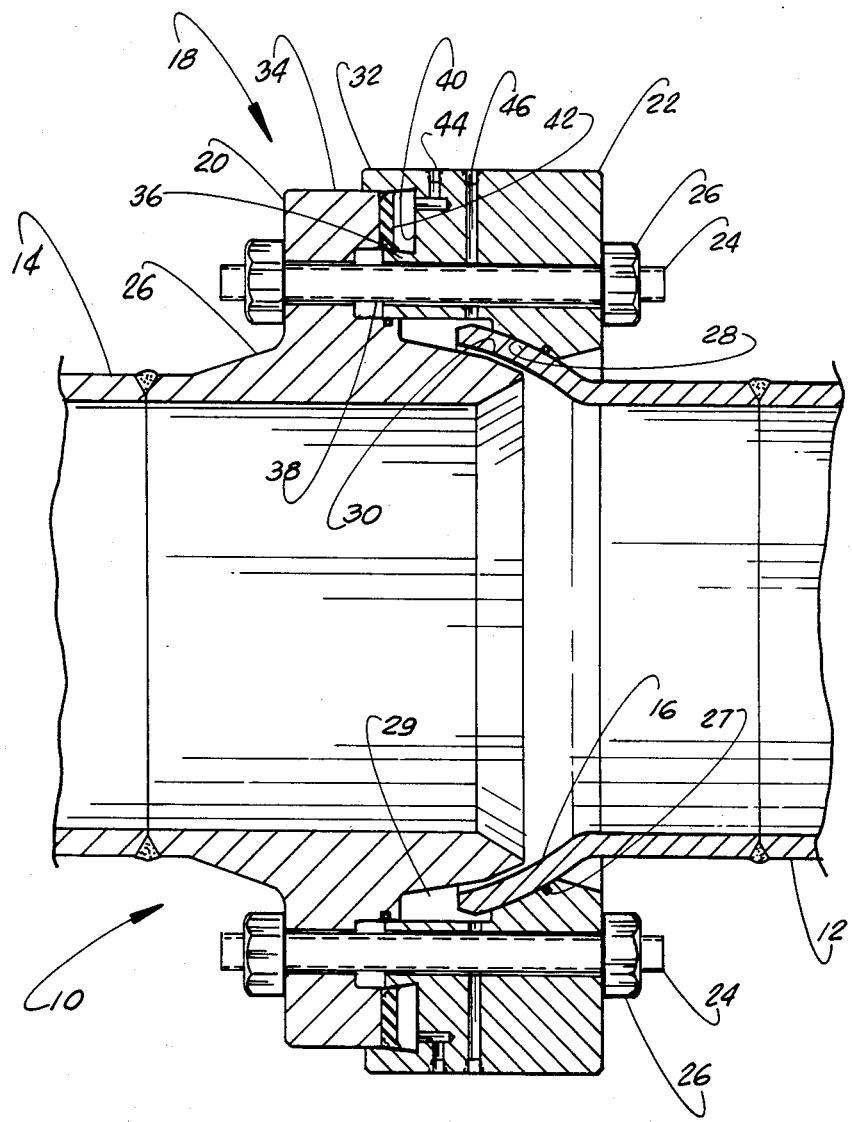
FIG. 3 is an enlarged partial sectional view of the pressure responsive system for relaxing the clamping on the bell flange to allow corrective movement in the joint to compensate for misalignment of the flowlines.

Connector joint 10 as shown in FIG. 2 is provided to connect between subsea flowlines (not shown). Joint 10 includes bell flange 16 which is secured to the end of flowline section 12 and assembly 18 for receiving ball flange 16 and which is secured to the end of flowline section 14. Assembly 18 includes flange 20 and clamp ring 22 which is secured to flange 20 by studs 24 and nuts 26. Inner surface 28 on ring 22 faces outer surface 30 on flange 20 and is spaced therefrom to form cavity 29 to receive the bell flange 16 therein. Ring 22 includes outer lip 32 which engages exterior surface 34 on flange 20 and inner lip 36 which engages within recess 38 on flange 20 immediately outward from the openings in flange 20 receiving studs 24. Inner surface 28 of ring 22 includes wiper ring 27 which excludes seaborne debris from cavity 29 between surfaces 28 and 30. Annular recess 40 is formed within the space between lips 32 and 36 of ring 22 and between flange 20 and ring 22. Annular seal element 42 is positioned within recess 40 and port 44 extends through ring 22 into communication with the interior of recess 40. Further, port 46 (shown out of position) extends through ring 22 into communication with cavity 29. Port 46 is a test port to provide an indication of leakage past bell flange 16 after joint 10 has been set. As shown in FIG. 2 and FIG. 3 annular seal element 42 sealingly engages outer lip 32 and inner lip 36 of clamp ring 22 to allow fluid to be contained under pressure in annular recess 40.

When joint 10 has been assembled as shown in FIG. 2, the tension applied to studs 24 is sufficient to ensure that bell flange 16 is rigidly clamped in metal-to-metal sealing relationship between surface 30 of flange 20 and surface 28 of ring 22.

Figure 1A:
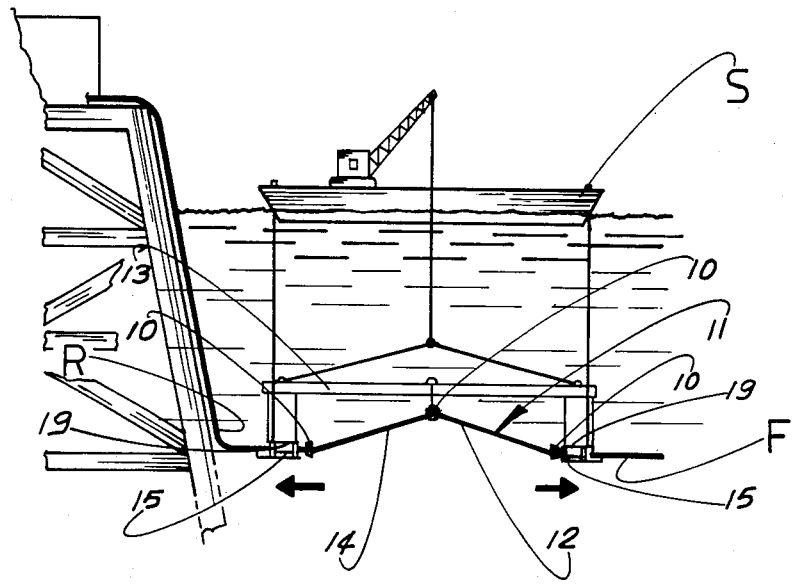
FIG. 1A is a schematic drawing of an articulated pipe section having the improved connection joints and being in position for installation.
Figure 1B:
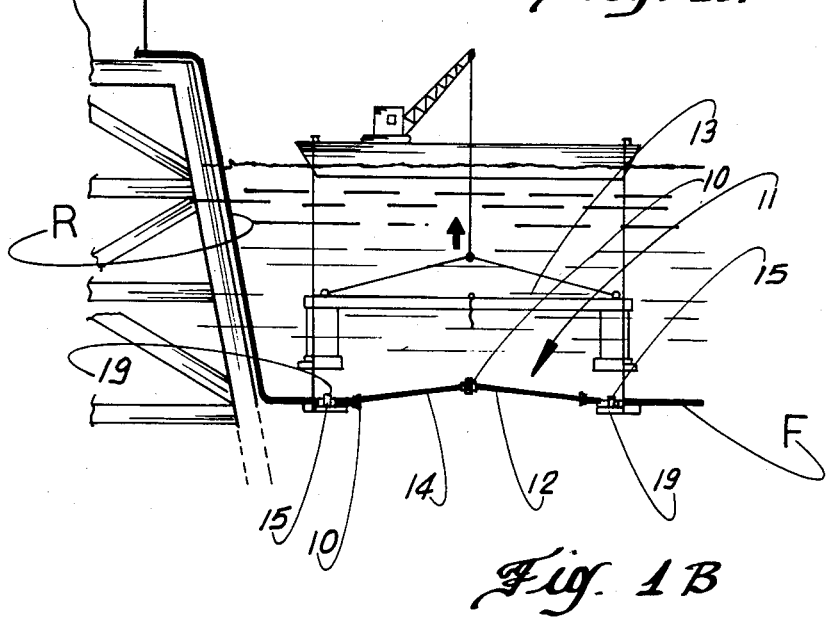
FIG. 1B is a schematic similar to FIG. 1A but showing the articulated joint installed.

A typical example of the use of joint 10 would be as shown in FIG. 1A wherein articulated pipe section 11 has been lowered from vessel S with installation frame 13 for installation between offshore production platform riser R and subsea flowline F. Articulated pipe section 11 includes three of the improved joints 10 interconnected by flowline sections 12 and 14. Articulated joint 11 has a collet type connector 15 on each end, which is similar to the collet connector of U.S. Pat. No. 3,096,999. Platform riser R and subsea flowline F each have a clamp hub 19 to which collet type connectors 15 clamp to rigidly connect articulated joint 11. As articulated joint 11 is lowered from vessel S and positioned between riser R and flowline F, improved joints 10 are held in a non-rigid configuration which will be described below. Since improved joints 10 are held in non-rigid configuration, articulated pipe-section 11 may be readily positioned between clamp hubs 19, and collet type connectors 15 may then engage clamp hubs 19 to rigidly connect articulated pipe section 11 without having to overcome any resistance to movement in improved joints 10. As shown in FIG. 1B, after articulated section 11 has been connected between hubs 19 by collet type connectors 15, improved joints 10 are left non-rigid until section 11 has flexed through improved joints 10 and achieved its "preferred" position. At this point installation frame 13 is no longer needed and is removed.

As shown in FIG. 3, the improved joint 10 of the present invention is in the non-rigid mode and as such is readily flexible. The joint 10 is made non-rigid or flexible by introducing pressurized hydraulic fluid through port 44 into recess 40 and thereby adding additional tension to studs 24 to move flange 20 and ring 22 axially away from one another and also to move surfaces 28 and 30 away from one another. This movement of surface 28 away from surface 30 releases the metal-to-metal sealing engagement of surfaces 28 and 30 with bell flange 16 and allows joint 10 to be readily flexible as long as pressurized fluid is in recess 40. Pressurized hydraulic fluid is locked into improved joints 10 of articulated section 11 until section 11 has been connected between riser R and flowline F. At this time the pressurized fluid is released from recess 40 through port 44 and therefor joints 10 become rigid with bell flange 16 being engaged by surfaces 28 and 30 in a metal-to-metal sealing relationship. Articulated section 11 thereby becomes a rigid all metal-to-metal sealed piping section connecting riser R to flowline F.

With the improved joint of the present invention, the connection of subsea lines does not require a swivel joint with dynamic seals which may be subject to leakage and may subject the flowlines to unnecessary bending. The improved joint provides the adjustment in angular relationship of the part of the joint to compensate for flowline misalignment and then can be clamped in its desired position with only static type metal-to-metal seals to avoid the difficulties experienced with prior swivel connections.

What is claimed is:

1. An adjustable flowline joint comprising
an arcuate bell flange,
an annular flanged assembly having a flange and a ring secured thereto with facing arcuate surfaces on the flange and the ring,
tension means for securing said flange to said ring,
said arcuate surfaces being contoured to receive said bell flange therebetween,
tensioning of said tension means clamping said bell flange between said arcuate surfaces,
pressure responsive means between said flange and ring, and
means for introducing fluid under pressure to said pressure responsive means to increase the tension on said tension securing means to displace said arcuate surfaces and thereby release said bell flange for angular adjustment by pivoting with respect to said flanged assembly.

2. An adjustable flowline joint according to claim 1 wherein said tension securing means includes
studs extending through said flange and said ring to secure said ring to said flange.

3. An adjustable flowline joint according to claim 1 wherein said pressure responsive means includes
an annular chamber between said ring and said flange of said flange assembly, and
the introduction of fluid pressure into said annular chamber forces said ring and flange apart sufficiently to relax the clamping engagement on said bell flange.

4. An adjustable flowline joint comprising
an arcuate bell flange,
an assembly having a flange and a ring with aligned bores therethrough,
studs extending through said bores,
nuts threaded on the ends of said studs,
an annular recess between said ring and said flange,
means for delivering fluid pressure to said annular recess, and
means sealing said annular recess to contain the fluid pressure delivered thereto and exerting a force responsive to such pressure on said ring and said flange,
said assembly flange and ring having facing arcuate surfaces spaced apart to receive said arcuate bell flange therein,
said nuts being tightened to tension said studs to bring said arcuate surfaces into clamping engagement with said arcuate bell flange,
fluid pressure delivered to said annular recess increasing tension on said studs sufficiently to cause their elongation to release clamping engagement of said arcuate bell flange and low relative angular movement between said arcuate bell flange and said flange assembly.

5. A structure for replacing a section of flowline in a subsea location comprising
a first flowline section,
a second flowline section,
a first adjustable flowline joint joining said first section and said second section together,
said joint including
an arcuate bell flange,
an annular flanged assembly having a flange and a ring secured thereto with facing arcuate surfaces on the flange and the ring,
said bell flange being secured on the end of one of said flowline sections and said flanged assembly being secured on the end of the other of said flowline sections,
tension means for securing said flange to said ring,
said arcuate surfaces being contoured to receive said bell flange therebetween,
tensioning of said tension means clamping said bell between said surfaces, and pressure responsive means for increasing the tension on said tension securing mens to increase the space between said arcuate surfaces whereby said bell flange may be adjusted angularly by pivoting with respect to said flanged assembly, said adjustable flowline joint providing a metal-to-metal seal connection between said flowline sections and said pressure responsive means releasing said metal-to-metal seal responsive to fluid pressure supplied thereto, and means at the opposite ends of each of said flowline sections for connecting to a subsea flowline.

* * * * *